US012511684B2

(12) United States Patent
Morgan et al.

(10) Patent No.: US 12,511,684 B2
(45) Date of Patent: Dec. 30, 2025

(54) TRANSACTION SESSION FOR WEARABLE PROCESSING DEVICE

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Aleah Jean Kadry, Atlanta, GA (US); Kelli Lee, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 489 days.

(21) Appl. No.: 17/537,585

(22) Filed: Nov. 30, 2021

(65) Prior Publication Data

US 2023/0169577 A1    Jun. 1, 2023

(51) Int. Cl.
*G06Q 30/00*        (2023.01)
*G06F 3/01*         (2006.01)
(Continued)

(52) U.S. Cl.
CPC ......... *G06Q 30/0643* (2013.01); *G06F 3/011* (2013.01); *G06F 3/017* (2013.01); *G06F 3/167* (2013.01); *G06N 20/00* (2019.01); *G06Q 20/208* (2013.01); *G06Q 20/321* (2020.05); *G06Q 20/325* (2013.01); *G06Q 20/42* (2013.01); *G06Q 30/0633* (2013.01); *G06T 7/50* (2017.01); *G06T 19/006* (2013.01); *G06V 10/70* (2022.01); *G06V 20/20* (2022.01); *G06V 40/28* (2022.01); *G06T 2207/10028* (2013.01); *G06T 2207/20081* (2013.01)

(58) Field of Classification Search
USPC .............................................. 705/26.1–27.2
See application file for complete search history.

(56) References Cited

U.S. PATENT DOCUMENTS

2017/0076272 A1*  3/2017  Zhou ..................... G06Q 30/06
2018/0150844 A1*  5/2018  Dolan .................... G06V 40/70
(Continued)

OTHER PUBLICATIONS

Hoyer, W. D., Kroschke, M., Schmitt, B., Kraume, K., & Shankar, V. "Transforming the Customer Experience through New Technologies". Journal of Interactive Marketing, 51(1), 57-71. https://doi.org/10.1016/j.intmar.2020.04.001 (Year: 2020).*

*Primary Examiner* — Anand Loharikar
(74) *Attorney, Agent, or Firm* — Schwegman Lundberg & Woessner, P.A.

(57) ABSTRACT

A transaction session is established directly or indirectly between a wearable processing device and a cloud-based server of a store. During the session, items are recognized by placing the items in a field-of-view of a front-facing camera of the device. Item recognition does not require item barcode identification. A depth sensor associated with the camera creates a three-dimensional mapping of a given item. The mapping and image features are processed to uniquely identify the item even when the item is associated with a same category of items. Customer input during the session can be achieved through gestures (hand, eyes, head, fingers, etc.) and/or voice commands. The customer input is translated and mapped into transaction interface commands/options and processed during the session to select items, delete items, view a transaction receipt, identify a quantity of items, obtain item details for a given item, etc.

10 Claims, 3 Drawing Sheets

(51) Int. Cl.
*G06F 3/16* (2006.01)
*G06N 20/00* (2019.01)
*G06Q 20/20* (2012.01)
*G06Q 20/32* (2012.01)
*G06Q 20/42* (2012.01)
*G06Q 30/0601* (2023.01)
*G06T 7/50* (2017.01)
*G06T 19/00* (2011.01)
*G06V 10/70* (2022.01)
*G06V 20/20* (2022.01)
*G06V 40/20* (2022.01)

(56) References Cited

U.S. PATENT DOCUMENTS

2021/0027360 A1* 1/2021 Shmueli ................. G06F 1/163
2022/0284214 A1* 9/2022 Tomasetta ............ G06V 40/172

* cited by examiner

TRANSACTION SESSION FOR WEARABLE PROCESSING DEVICE

BACKGROUND

As technology advances and consumers embrace it in all aspects of their lives, many retailers have taken advantage of this phenomenon with technology offerings that make it easier for their customers to interact with the retailers and transaction with the retailers.

For example, most retail stores now have Self-Service Checkouts (SCOs) where customers of the stores can self-checkout. Customers utilizing SCOs typically have to pick items from the store shelves, carry them to the SCOs, scan the item barcodes at the SCOs, and pay for the goods. The problem with this approach is that the customers have to handle the items multiple times before checking out (pick from shelves, place in cart, remove from cart, scan at the SCOs, bag the items, etc.).

Consequently, many retailers now offer mobile applications accessible from their customer phones that permit their customers to scan item barcodes as they shop in the stores and place scanned items in bags of a cart or a basket. Scan as you shop applications have streamlined the customer experience within the stores. However, these applications still have a number of problems, which have limited customer adoption of this technology.

The scan as you shop applications require the user to actively operate their mobile phones as they shop. This creates a usability issue because one customer hand has to hold a picked item while the other customer hand has to operate the phone and interact with the mobile application during shopping. Customers struggle to carry their personal belongings, deal with small children and/or push a cart (or carry a basket) while operating scan as you shop applications on their phones. Many customers find this experience too cumbersome and difficult.

Additionally, most scan as you shop applications require the customers to properly orient a held item so that its barcode is placed in the field of view of the phone's camera for properly identifying and recording an item identifier for the item.

As a result, there is a need for improved scan as you shop applications, workflows, and interfaces.

SUMMARY

In various embodiments, a system and methods for transaction sessions with wearable processing devices are presented.

According to an embodiment, a method for managing a transaction session with a wearable processing device is provided. A connection to a cloud-based store server is requested during a shopping trip of a customer to a store. A wireless transaction session is established with the cloud-based store server based on the requested connection. Item images placed within a field of view of a front-facing camera of a wearable processing device worn by the customer are captured during the transaction session. Item identifiers and item information are obtained for items associated with the item images based at least on the item images. Gestures of the customer are translated during the transaction session into customer selections, customer options, and customer-initiated commands associated with a virtual shopping cart maintained by the cloud-based store server during the transaction session; the virtual shopping cart comprises the item identifiers and item information.

DETAILED DESCRIPTION

Figure 1:
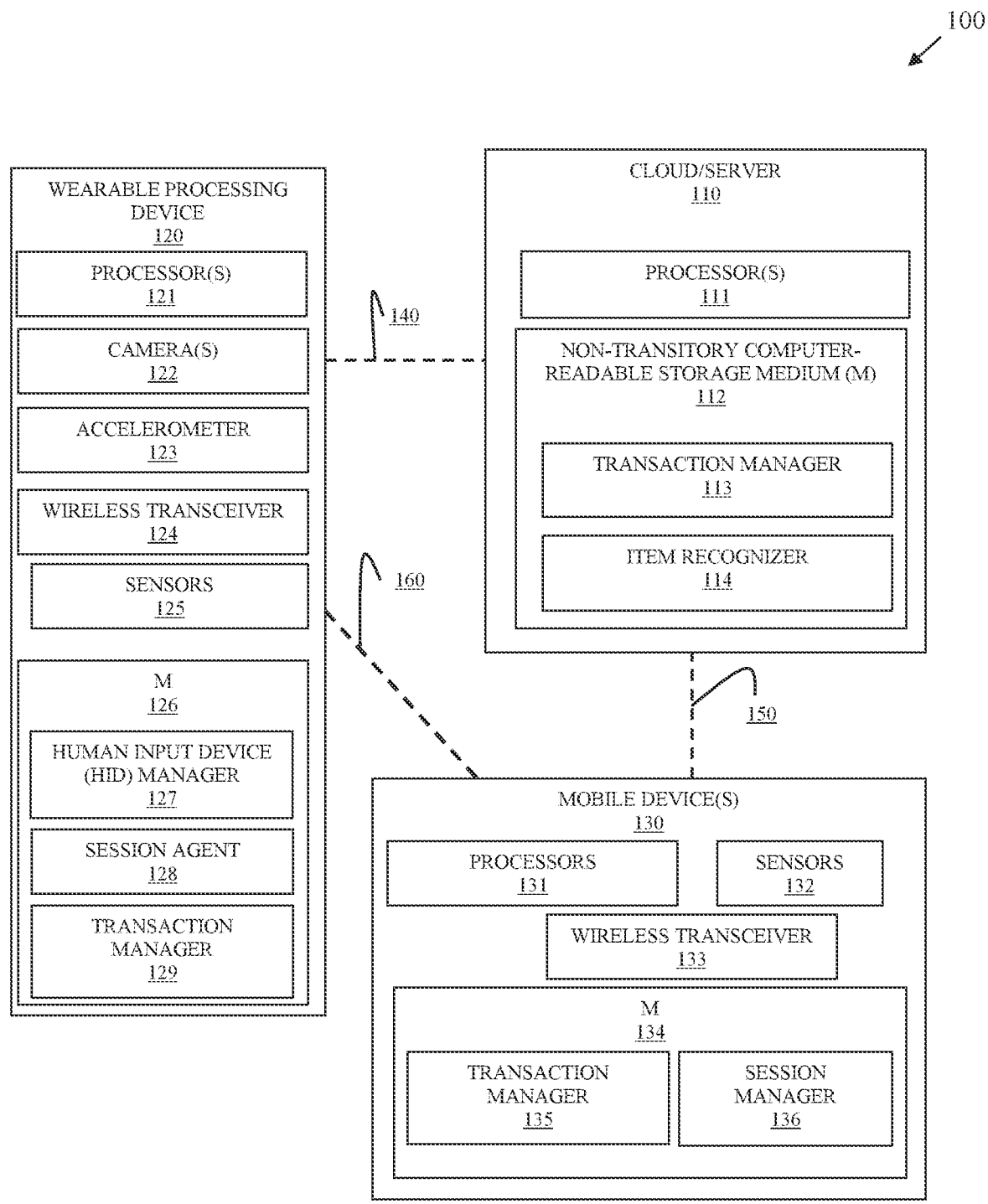
FIG. 1 is a diagram of a system for managing transaction sessions with wearable processing devices, according to an example embodiment.

FIG. 1 is a diagram of a system/platform 100 for managing transaction sessions with wearable processing devices, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of conducting, operating, and managing transaction sessions via a wearable processing device, presented herein and below.

System/platform 100 (herein after just "system 100") provides a processing environment by which a customer engages in a transaction session with a retail store's server via an improved and seamless interface associated with a wearable processing device (such as glasses/goggles/headsets) during a shopping trip at the store. The wearable processing device permits the customer to view their surroundings unobstructed through the lenses of the wearable processing device. A camera of the device captures what the customer is looking at within the physical surroundings during the session and permits seamless and handsfree identification of items being handled by the customer. Within a portion of one or both lenses, superimposed item and transaction information is rendered for viewing, selection, acceptance, and/or modification by the customer using Augmented Reality (AR) techniques.

The wearable processing device may have its own independent wireless network connection with the store's server or may utilize a wireless connection to the store's server via a second device in possession of or in proximity to the customer. Item recognition of items captured within the field-of-view of the lenses do not have to include images of the items' barcodes. Moreover, machine-learning models may be continuously trained to identify hard to recognize items, such that the item recognition is continuously improving on item recognition accuracy.

The customer may complete the session and pay for items of the customer's virtually maintained cart (with the store's server) without the customer having to operate any additional device during the shopping trip or during the transaction session, such as the customer's phone, a Self-Service Terminal (SST) during self-checkouts, and/or a Point-Of-Sale (POS) terminal during cashier-assisted checkouts.

A variety of embodiments and operational features of system 100 are now discussed with reference to FIG. 1.

As used herein, the terms "user," "consumer," and/or "customer," may be used interchangeably and synonymously herein and below. This refers to an individual who is wearing a wearable processing device and is engaged in a transaction session with a store's server during a customer's shopping trip with a store.

The system 100 comprises a cloud/server 110, a wearable processing device 120, and a user-mobile devices 130 (optional configuration of system 100).

Cloud/server 110 comprises at least one processor 111 and a non-transitory computer-readable storage medium 112. Medium 112 comprises executable instructions for a transaction manager 113 and an item recognizer 114. The executable instructions when provided to processor 111 from medium 112 cause the processor 111 to perform operations discussed herein and below with respect to 113-114.

Wearable processing device 120 comprises at least one processor 121, at least one camera 122, an accelerometer 123, a wireless transceiver 124, zero or more sensors 125, and a non-transitory computer-readable storage medium 126. Medium 126 comprises executable instructions for a Human Input Device (HID) manager 127, a session agent 128, and a transaction manager 129. The executable instructions when provided to processor 121 from medium 126 cause the processor 121 to perform operations discussed herein and below with respect to 127-129.

Mobile device 130 (optional) comprises at least one processor 131, one or more sensors 132, wireless transceiver 133, and a non-transitory computer-readable storage medium 134. Medium 134 comprises executable instructions for a transaction manager 135 and a session manager 136. The executable instructions when provided to processor 131 from medium 134 cause the processor 131 to perform operations discussed herein and below with respect to 135 and 136.

System 100 initially detects a connection request to cloud/server 110 for a transaction session associated with a customer's shopping trip to a store of a given retailer. Detection can occur or can be requested in a variety of manners.

For example, a Global Positioning Satellite (GPS) sensor 125 may report a current physical location of wearable processing device 120, which transaction manager 129 maps to a given store's location. The lenses (AR display) of device 120 superimposes a question overlaid on the customer's view of their surroundings as a notification stating, "Start a Shopping Trip with Store X?" HID manager 125 monitors a front facing camera 122, a rear facing camera 122, the accelerometer 123, and/or the sensors 125 (such as a microphone, pressure sensors on the rims of glasses 120, and/or a button located on the rims of the glasses) for customer-provided input. An affirmative response causes session agent 128 to activate wireless transceiver 124 and establish a wireless connection 140 between transaction manager 129 and transaction manager 113 of the store's cloud/server 110.

In another example, glasses 120 maintains a continuous wireless connection 160 using wireless transceiver 124 with mobile device 130 via wireless transceiver 133 of mobile device 130. (Note mobile device 130 can be in a pocket, purse, of bag of the customer and does not have to be actively operated by the customer for this continuous wireless connection 160.) Mobile device 130 uses a GPS sensor 132 to detect a mobile device's physical location being associated with a physical location of the store. Session manager 136 establishes a wireless connection 150 (cellular, Wi-Fi, etc.) between transaction manager 113 of the cloud/server 110 to transaction manager 135 of mobile device 130. Based on an existing connection 160, session manager 136 sends the notification to session agent 128 for presenting the question as to whether the customer wants to start a shopping trip (as discussed above in the previous example) on the AR lenses/display of glasses 120 to the customer. An affirmative response from the customer as detected by HID manager 126 causes session agent 128 to interact with transaction manager 135 during the transaction session being conducted between transaction manager 135 and transaction manager 113 over wireless connection 150. In this embodiment, session manager 136 acts as a proxy between a user-facing interface of transaction manager 135 of mobile device 130 and HID manager 125 via session agent 128 over wireless connection 160.

In still another embodiment, a Quick Response (QR) code placed on a display at the front of the store or placed on a label of a surface proximate to the store's entrance is captured by the customer via a front-facing camera 122 of glasses 120 or via a camera (not illustrated) of mobile device 130. The session agent 128 or session manager 136 establishes connection 140 or connection 150 between glasses 120 or device 130 based on reading the QR code and the notification presented on the AR lenses/display of glasses 120 for an affirmative response by the customer in manners similar to what were discussed above in the previous two examples (first example, glasses 120 directly interacts with transaction manager 113 of cloud/server 110 for connection 140 during the session using transaction manager 129; second example, glasses 120 indirectly interacts with transaction manager 113 of cloud/server 110 over connection 160 via transaction manager 135 of device 130 and device 130 directly interacts with transaction manager 113 via transaction manager 135).

Once an affirmative response to the shopping trip notification is received from the customer via HID manager 127 over connection 140 or over both connections 160 and 150, a transaction session for a customer's shopping trip with a store is established between transaction manager 129 and transaction manager 113 (direct connected session) or between transaction manager 135 and transaction manager 113 (indirect connected session).

Session agent 128 begins monitoring HID manager 127 events for user-directed input and begins monitoring images appearing within a field of view of front facing camera 122 for item images of items after the transaction session is established. Interaction for a direct connected session may cause transaction manager 129 to download and to process cloud/server-hosted Application Programming Interfaces (APIs) to transaction manager 113. The APIs may already be available and in use by transaction manager 135 for an indirect connected session.

During the transaction session, when a customer desires to purchase an item, the customer picks the item off a shelf and places it within the field of view of front facing camera 122.

In a directly connected session, session agent 128 samples features of the item image and sends the features over connection 140 to item recognizer 114. Item recognizer 114 scores the features and matches to candidate items, when a score of a candidate item is above a predefined threshold, item recognizer 114 returns the candidate item's code to transaction manager 113 and transaction manager 113 provides to transaction manager 129. Transaction manager 129 displays the item name and image within the AR lenses/display of glasses 120 to the customer. When none of the candidate items for the features of the item image are above the predefined threshold, a top N number of item identifiers for the candidate items are provided by recognizer 114 to manager 113. Manager 113 provides to manager 129 and the candidate item images and descriptions are rendered within the AR lenses/display for selection by the customer. The customer may select one of the candidate item images through input identified by HID manager 127. For example, a thumbs up placed in front of a displayed candidate item image is interpreted as a user selection for the item code associated with the candidate item image. Each candidate item image may be presented sequentially to the customer within the AR lenses/display and browsed by the customer swiping a hand to the right or left within the field of view of front facing camera 122 to see a previously presented candidate item image (swipe right) or see a next candidate item image (swipe left).

Some items may not be able to be completely recognized based on the captured item image. For example, different flavors of a brand-name drink, in such cases item recognizer 114 provides the different subcategories (flavors) for manager 113 and the user is presented the choices via the AR lenses/display for selection via HID manager 127.

When an item is recorded for the transaction session through automatic recognition or through user-selection via HID manager 127, the item code for the selected item is stored in a virtual cart being maintained for the shopping trip and the transaction session by transaction manager 113 for the customer. Additionally, when an item code is added a corner of the AR lenses/display is updated to show a current running price total and a total quantity of items associated with the virtual cart, such that the customer is always aware of a current price of the items recorded in their virtual shopping cart during the transaction session.

In an indirectly connected session, the above-described workflow of item recognition, selection, and updating of the virtual shopping cart is similar; however, the workflow is processed over connection 160 (glasses 120 to mobile device 130) and connection 150 (mobile device 130 to cloud/server 110). Here, session agent 128 interacts with session manager 136 to proxy a user-facing interface to transaction manager 135 on the glasses 120 using HID manager 127 to capture and process user inputs.

In an embodiment, glasses 120 includes a depth sensor 125, which allows the features of an item image taken to be taken in three dimensions (3D) to capture an item's depth, height, and width. A 3D mapping produced by camera 122 can be derived using the depth sensor 120 with the 3D mapping provided as the item features to item recognizer 114. This allows item recognizer 114 to distinguish between different sized items of the same type, such as an 8-ounce drink versus a 12-ounce drink; a smaller sized piece of fruit versus a larger sized piece of the same fruit. Moreover, this provides fine grain item recognition which has heretofore not been possible in the industry.

In an embodiment, when a candidate item's image is captured by front facing camera 122 and that image includes a completed item barcode, item recognizer 114 can quickly identify the item code, item image, and item pricing/details and return to manager 113, which is then used to update the virtual cart causing the update to be reflected in the cart summary presented to the customer in a corner of the AR lenses/display of glasses 120.

HID manager 127 can map a variety of user gestures and other user provided inputs during the transaction session to options associated with a user-facing interface of transaction manager 129 and transaction manager 135. For example, when camera 122 detects a customer hand gesture to the side of one of the AR lenses, HID manager 127 maps this gesture to a user-facing interface option associated with a request by the customer to view the total list of items scanned and recorded (current transaction receipt) in the virtual cart for the session. A hand gesture that moves from a center of the two lenses to the side is mapped to a user-interface request/option to minimize the transaction receipt back to a transaction total and total quantity of items in a corner of the AR lenses/display of glasses 120. To scroll the transaction items in the receipt, the customer moves their hands upward or downward. The displayed items are numbered or labeled when presented within the AR lenses/display, a microphone sensor 125 may capture the customer speech that references a specific number in the list and the customer and see more details or delete the item associated with the specific number audibly (which HID manager 127 maps the audible speech into a text command recognized by the user-facing interface of manager 129 and/or manager 135). A quantity of any given item can be increased by the customer placing a same item back in the field of view of the AR lenses/display for each number of the items or the customer can place the item in the field of view and audibly state quantity is N.

In an embodiment, HID manager 127 tracks events from sensors 125 and accelerometer 123 of glasses 120 and maps predefined gestures and/or audible spoken words into commands recognized by the user-facing interface of manager 129 and manager 135. The gestures can be a head nod up, a head node down, head swipes side to side, a head tilt up down or side to side, which are detected by accelerometer 123; eye movements of the customer detected in images of a front-facing camera 122 of glasses 120 while eyes of the customer are being tracked during the transaction session; spoken words detect recorded as audio by a microphone sensor 125; finger taps on a surface of the rims of the glasses 120 detected by a pressure sensor 125; pressed buttons manufactured in the rims of the glasses 120 and associated with a button sensor 125, etc.

The customer can finish their session and corresponding their shopping trip through payment for the virtual shopping cart. Payment workflows can occur in multiple manners. Payment processing can be initiated by the customer capturing the field of view of front facing camera 122 a QR code being displayed on an SST, this causes the QR code to be decoded and an SST identifier for the SST communicated to transaction manager 113. Manager 113 identifies which device that communicated the SST identifier, glasses 120 or device 130 and identifies the virtual cart. Using the SST identifier, the SST is placed in payment mode for the transaction details associated with the customer's virtual cart and payment can be received in a number of manners. The total transaction receipt is displayed on a display of the SST and displayed within the AR lenses/display of glasses 120. The customer may nod or may audibly say yes and a registered payment method for the customer is processed for the payment. In another case, the customer may simply say ready for payment audibly, which HID manager 127 translated into a pay now option associated with the user-facing interface of manager 129 and 135. If the customer does not have a registered payment method in their profile or if the customer wants to use a different payment method from an existing registered payment method, the customer may place a payment card in the field of view of the AR lenses/display and the image of the payment card is processed using Optical Character Recognition (OCR) and provided to transaction manager 113 as a new payment method.

In an embodiment of an indirect connected session, session manager 136 keeps the user-facing interface of transaction manager 135 in synchronization with actions taken by the user during the session and the current state of the session. This allows the customer/user to switch back and forth between providing gestures or speech as input via glasses 120 and touch-based input for the user-facing interface of transaction manager 135 on device 130. The customer/user can perform or provide commands that the user may be unfamiliar with through glasses 120 using the touch-based input for the user-facing interface of manager 135 on device 130. It is noted that any available command to the user-facing interface of manager 135 is available to the user through the gestures or audio inputs on glasses 120, such that this option is available as an alternative input mechanism to the user but does not have to be used by the user.

In an embodiment, item recognizer 114 utilizes a trained machine-learning model for item recognition. During a training session, each item presented to the front facing camera 122 of glasses 120 is labeled with its item code. The model configures itself during the training session to predict item codes when presented images without the corresponding labels. Furthermore, when options for candidate items are presented to customers during shopping sessions, the actual item codes selected by the customers are noted with the corresponding features of the item images and used in subsequent training sessions of the model to continuously improve item recognition accuracy of the model. In cases where the item barcode is visible in the images, the item barcode may be provided with the item image for improving the accuracy of the model.

In an embodiment, the actual item images captured by camera 122 for items are provided to item recognizer 114 for item recognition rather than select features. In this embodiment, the actual item images may be modified for resolution to reduce the size of the item images before being provided to item recognizer 114.

In an embodiment, item recognizer 114 may be processed on glasses 120 and/or mobile device 130.

In an embodiment, glasses 120 include a high-resolution camera 122 of 12 megapixels or more and glasses 120 include a depth sensor 125 associated with camera 122. Features of the item images captured by camera 122 and 3D mapping of the item image captured by depth sensor 125 are processed on glasses 120 and/or mobile device 130 to derive a set of features (image and dimensions), which are provided to item recognizer 114 for item recognition.

In an embodiment, an AR generated mapping of the store in connection with a planogram are used to provide location information for where each item image is captured within the store and the current location as well as the planogram are provided as input with the item images to the item recognizer 114 for item recognition.

It is noted that although the wearable processing device 120 was discussed as glasses 120, the wearable processing device 120 may be goggles 120 or an AR headset 120.

Figure 2:
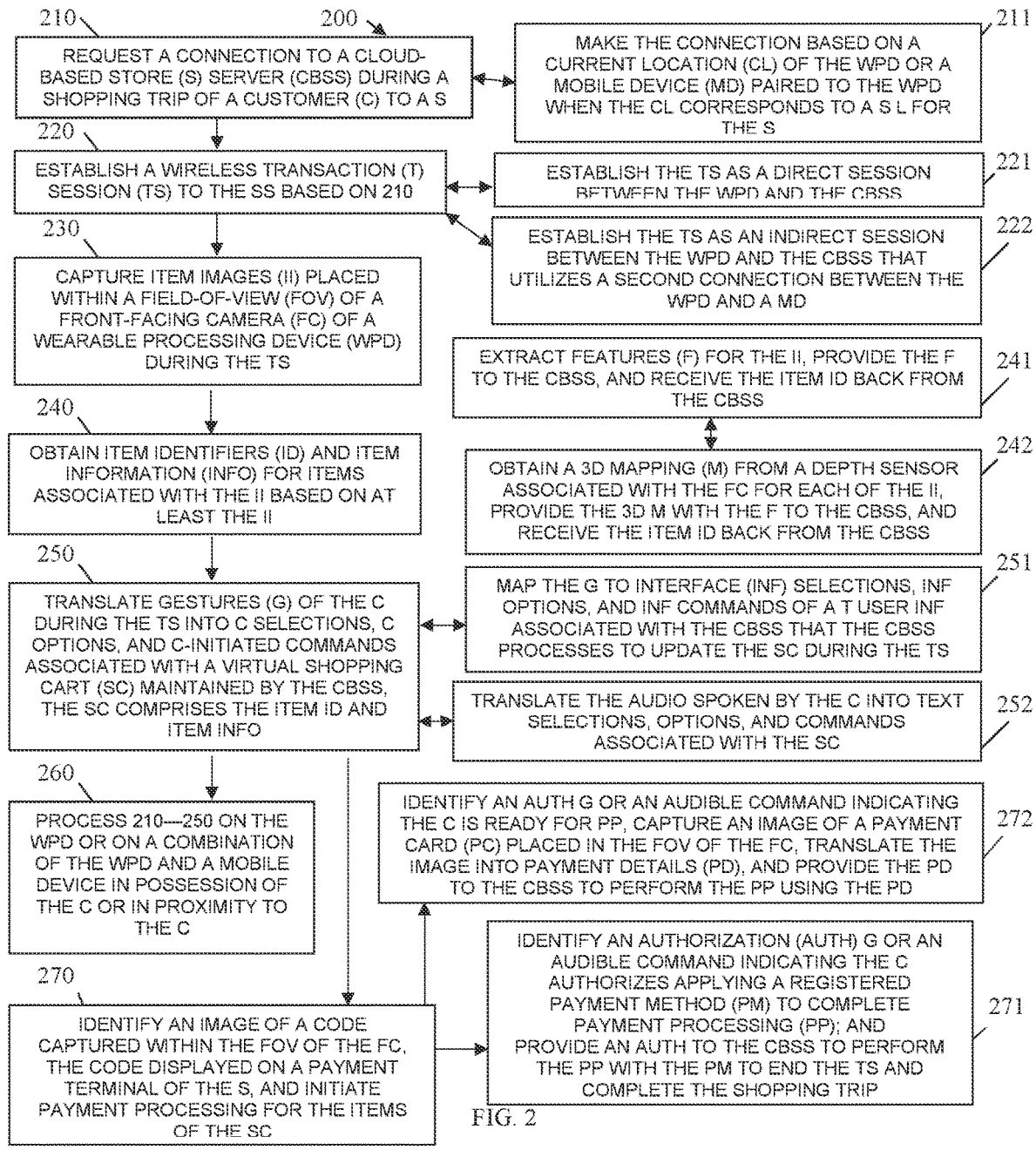
FIG. 2 is a diagram of a method for managing a transaction session with a wearable processing device, according to an example embodiment.
Figure 3:
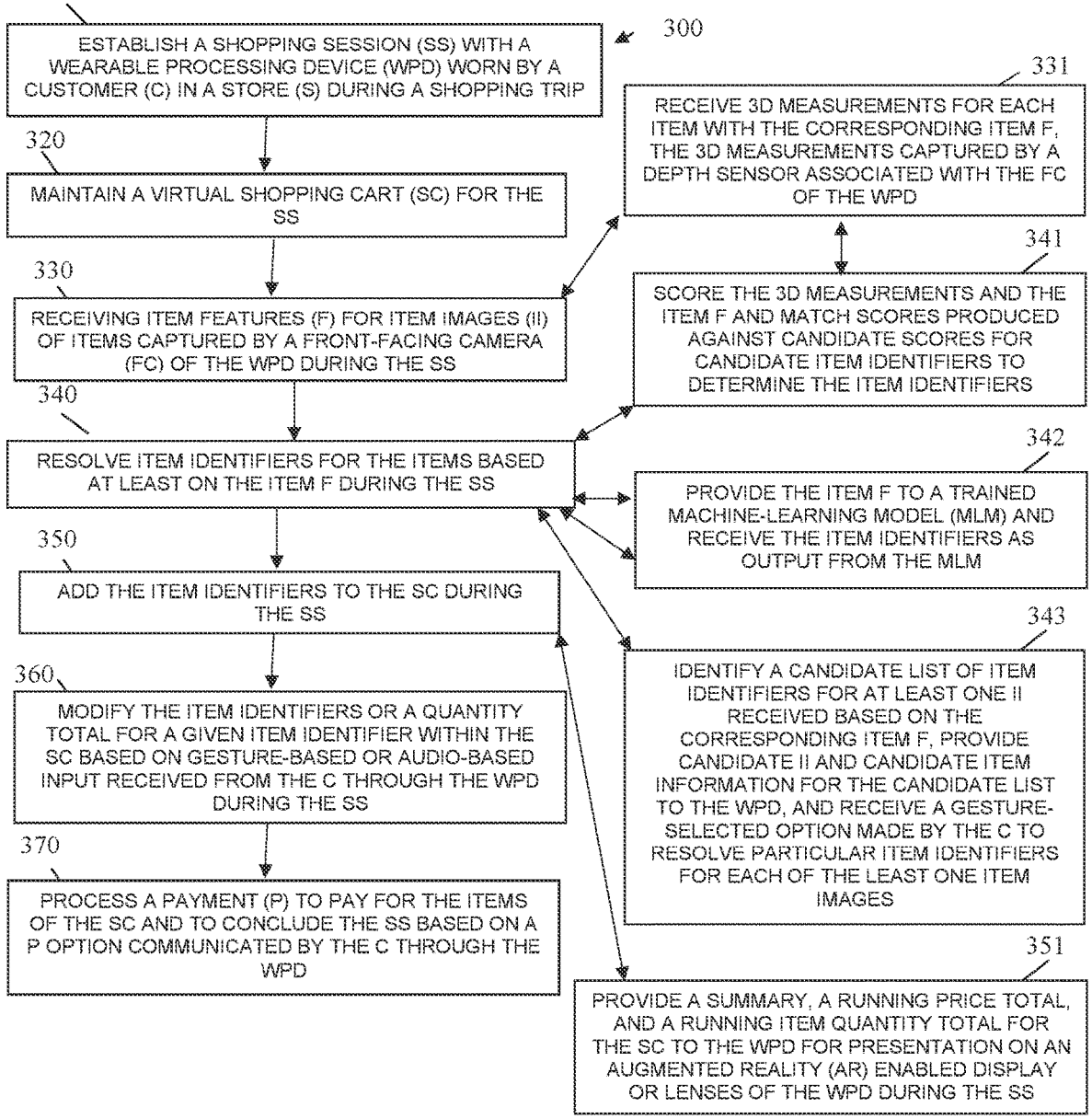
FIG. 3 is a diagram of another method for managing a transaction session with a wearable processing device, according to an example embodiment.

The above-referenced embodiments and other embodiments are now discussed within FIGS. 2-3.

FIG. 2 is a diagram of a method 200 for managing a transaction session via a wearable processing device, according to an example embodiment. The software module(s) that implements the method 200 is referred to as a "transaction session assistant." The transaction session assistant is implemented as executable instructions programmed and residing within memory and/or a non-transitory computer-readable (processor-readable) storage medium and executed by one or more processors of one or more devices. The processor(s) of the device that executes the transaction session assistant are specifically configured and programmed to process the transaction session assistant. The transaction session assistant may have access to one or more network connections during its processing. The network connections can be wired, wireless, or a combination of wired and wireless.

In an embodiment, the device that executes the transaction session assistant is wearable processing device 110. In an embodiment, the devices that execute the transaction session assistant are wearable processing device 120 and mobile device 130.

In an embodiment, the transaction session assistant is all or some combination of 127, 128, 129, 135, 136, and/or 114 (implemented on device 120 or device 130).

At 210, the transaction session assistant requests a connection to a cloud-based store server 110 during a shopping trip of a customer to a store.

In an embodiment, at 211, the transaction session assistant makes the connection based on a current location of a wearable processing device 120 or a current location of a mobile device 130 paired to the wearable processing device 120 when the current location corresponds to a known store location for the store.

At 220, the transaction session assistant establishes a wireless transaction session to the cloud-based server 110 based on the request of 210.

In an embodiment, at 221, the transaction session assistant establishes the transaction session as a direct session between the wearable processing device 120 and the cloud-based server 110 (using wireless connection 140).

In an embodiment, at 222, the transaction session assistant establishes the transaction session as an indirect session between the wearable processing device 120 and the cloud-based server 110 that utilizes a second connection between the wearable processing device 110 and the mobile device 130 (using wireless connection 160 with the mobile device 130 using wireless connection 150 to the cloud-based store server 110).

At 230, the transaction session assistant captures item images placed within a field-of-view of a front-facing camera 122 of the wearable processing device 120 during the transaction session.

At 240, the transaction session assistant obtains item identifiers and item information for the items associated with the item images based on at least the item images.

In an embodiment, at 241, the transaction session assistant extract features for the item images, provides the features to the cloud-based store server 110 and receives the item identifiers back from the cloud-based store server 110.

In an embodiment of 241 and at 242, the transaction session assistant obtains a 3D mapping from a depth sensor 125 associated with the front-facing camera 122 for each item image, provides the 3D mapping with the item features to the cloud-based store server 110, and receives the item identifiers back from the cloud-based store server 110.

At 250, the transaction session assistant translates gestures of the customer during the transaction session into customer selections, customer options, and customer-initiated commands associated with a virtual shopping cart maintained by the cloud-based store server 110 during the transaction session. The virtual shopping cart comprises the item identifiers and item information for each of the items. The gestures can be based on hand gestures made in front of the front-facing camera 122, eye gestures made to a rear-facing camera 122, or head tilts/nods/swings detected by an accelerometer 123 of the wearable processing device 120.

In an embodiment, at 251, the transaction session assistant maps the gestures to interface selections, interface options, and interface commands of a transaction user interface associated with the cloud-based store server 110 that the cloud-based store server 110 processes to update and to maintain the virtual shopping cart during the transaction session.

In an embodiment, at 252, the transaction session assistant further translates audio spoken by the customer (captured by a microphone sensor 125 of the wearable processing device 120) into text selections, text options, and text commands associated with the virtual shopping cart and processed by the cloud-based store server 110.

In an embodiment, at 260, the transaction session assistant is processed only on the wearable processing device 120 or the transaction session assistant is processed on a combination of the wearable processing device 120 and a mobile device 130 in possession of or in proximity to the customer during the transaction session.

In an embodiment, at 270, the transaction session assistant identifies an image of a code captured within the field-of-view of the front-facing camera 122. In an embodiment, the code is a QR code displayed on a display of a payment terminal (SST). In response to the captured code, payment processing for the items of the virtual shopping cart is initiated with the virtual shopping cart.

In an embodiment of 270 and at 271, the transaction session assistant identifies an authorization gesture or an audible command indicating the customer authorizes applying a registered payment method to complete the payment processing and the transaction session assistant provides an authorization to the cloud-based store server 110 to perform the payment processing with the registered payment method and to end the transaction session completing the shopping trip of the customer with the store.

In an embodiment of 270 and at 272, the transaction session assistant identifies an authorization gesture or an audible command indicating the customer is ready for payment processing. The transaction session assistant captures an image of a payment card placed in the field-of-view of the front-facing camera 122 and transaction the image into payment details. The transaction session assistant provides the payment details to the cloud-based store server 110 to perform the payment processing using the payment details. In another case, the image of the payment card is provided by the transaction session assistant to the cloud-based store server 110 and the cloud-based store server translates the image into the payment details and performs the payment processing with the payment details.

FIG. 3 is a diagram of another method 300 for operating, conducting, and managing a transaction session with a wearable processing device, according to an example embodiment. The software module(s) that implements the method 300 is referred to as a "glasses shopping manager." The glasses shopping manager is implemented as executable instructions programmed and residing within memory and/or a non-transitory computer-readable (processor-readable) storage medium and executed by one or more processors of a device. The processors that execute the glasses shopping manager are specifically configured and programmed for processing the glasses shopping manager. The glasses shopping manager may have access to one or more network connections during its processing. The network connections can be wired, wireless, or a combination of wired and wireless.

In an embodiment, the device that executes the glasses shopping manager is device 110. In an embodiment, the device that executes the glasses shopping manager is a combination of devices comprising 110, 120, and optionally 130. In an embodiment device 120 is glasses, goggles, or an AR headset.

In an embodiment, the glasses shopping manager is some combination or all of 113, 114, 127, 128, 129, 135, 136, and/or method 200.

The glasses shopping manager presents another and, in some ways, an enhanced processing perspective from that which was shown above for system 100 and/or method 200.

At 310, the glasses shopping manager establishes a shopping session with a wearable processing device 120 (hereinafter AR-enabled glasses 120). The AR-enabled glasses 120 are worn by the customer in a store during a shopping trip. Lenses or a display of the AR-enabled glasses 120 permit the customer to view their physical surroundings in the store along with AR information rendered as an overlay of the physical surroundings.

At 320, the glasses shopping manager maintains a virtual shopping cart for the shopping session.

At 330, the glasses shopping manager receives item features for item images captured by a front-facing camera 122 of the AR-enabled glasses 120 during the shopping session.

In an embodiment, at 341, the glasses shopping manager receives 3D measurements for each item with the corresponding item features; the 3D measurements captured by a depth sensor 125 associated with the front-facing camera 122 of the AR-enabled glasses 120.

At 340, the glasses shopping manager resolves item identifiers for the items based on at least the item features during the shopping session.

In an embodiment of 331 and 340, at 341, the glasses shopping manager scores the 3D measurements and the item features, and the glasses shopping manager matches scores produced against candidate scores for candidate item identifiers to determine the item identifiers.

In an embodiment, at 342, the glasses shopping manager provides the item features to a trained machine-learning model (such as item recognizer 114) and receives the item identifiers as output from the machine-learning model.

In an embodiment, at 343, the glasses shopping manager identifies a candidate list of item identifiers for at least one of the item images based on the corresponding item features. The glasses shopping manager provides the candidate item images and candidate item information for the candidate list to the AR-enabled glasses 120 and receives a gesture-selected option made by the customer to resolve particular item identifiers for each of the corresponding item images, which were unable to be initially determined by the glasses shopping manager.

At 350, the glasses shopping manager adds the item identifiers and corresponding item details/information to the virtual shopping cart during the shopping session.

In an embodiment, at 351, the glasses shopping manager provides a summary, a running price total, and a running item quantity total for the virtual shopping cart to the AR-enabled glasses 120 for presentation in an AR-enabled display or AR-enabled lenses of the AR-enabled glasses 120 during the shopping session.

At 360, the glasses shopping manager modifies the item identifiers or a quantity total for a given item identifier within the virtual shopping cart based on gesture-based or audio-based input received from the customer through the AR-enabled glasses 120 during the shopping session.

At 370, the glasses shopping manager processes a payment for the items of the virtual shopping cart to conclude the shopping session based on a payment option communicated by the customer through the AR-enabled glasses 120.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    requesting, by one or more processors of one or more devices, a connection to a cloud-based store server during a shopping trip of a customer to a store;
    establishing, by the one or more processors, a wireless transaction session to the cloud-based store server based on the requesting;
    capturing, by the one or more processors, item images placed within a field-of-view of a front-facing camera of a wearable processing device worn by the customer during the transaction session;
    obtaining, by the one or more processors, item identifiers and item information for items associated with the item images based at least on the item images;
    translating, by the one or more processors, gestures of the customer during the transaction session into customer selections, customer options, and customer-initiated commands associated with a virtual shopping cart maintained by the cloud-based store server during the transaction session, wherein the virtual shopping cart comprises the item identifiers and item information;
    obtaining, by the one or more processors, a three-dimensional (3D) mapping from a depth sensor associated with the front-facing camera for each of the item images, providing the 3D mappings with features extracted from the item images to the cloud-based store server, and receiving the item identifiers back from the cloud-based store server, wherein the 3D mapping allows distinguishing between different sized items of a same type;
    wherein the depth sensor and front-facing camera comprise a high-resolution camera of at least 12 megapixels or more that enables fine grain item recognition through the 3D mapping and features for distinguishing between different sized items of the same type including different sized drinks and different sized pieces of fruit;
    wherein the wearable processing device comprises an Augmented Reality (AR)-enabled display or AR-enabled lenses that provides a summary, a running price total, and a running item quantity total for the virtual shopping cart to the customer during the transaction session; and
    identifying, by the one or more processors, an image of a code captured within the field-of-view of the front-facing camera, wherein the code is displayed on a payment terminal of the store, and initiating payment processing for the items of the virtual shopping cart.

2. The method of claim 1 further comprising, processing the method on one or more of the wearable processing device worn by the customer and a mobile device in possession of the customer or in proximity to the customer.

3. The method of claim 1 further comprising, identifying, by the one or more processors, an authorization gesture or an audible command indicating the customer authorizes applying a registered payment method to complete payment processing and providing an authorization to the cloud-based store server to perform the payment processing with the registered payment method to end the transaction session and complete the shopping trip of the customer to the store.

4. The method of claim 1 further comprising, identifying, by the one or more processors, an authorization gesture or an audible command indicating the customer is ready for payment processing, capturing an image of a payment card placed in the field-of-view of the front-facing camera, translating the image into payment details, and providing the payment details to the cloud-based store server to perform payment processing using the payment details to end the transaction session and complete the shopping trip of the customer to the store.

5. The method of claim 1, wherein requesting further includes making the connection based on a current location of the wearable processing device or a mobile device paired to the wireless processing device when the current location corresponds to a store location for the store.

6. The method of claim 1, wherein establishing further includes establishing the wireless transaction session as a direct session between the wearable processing device and the cloud-based server.

7. The method of claim 1, wherein establishing further includes establishing the wireless transaction session as an indirect session between the wearable processing device and the cloud-based server that utilizes a second connection between the wearable processing device and a mobile device.

8. The method of claim 1, wherein obtaining further includes extracting features of the item images, providing the features to the cloud-based store server, and receiving the item identifiers back from the cloud-based store server.

9. The method of claim 1, wherein translating further includes mapping the gestures to interface selections, interface options, and interface commands of a transaction user interface associated with the cloud-based store server that the cloud-based store server processes to update the virtual shopping cart during the transaction session.

10. The method of claim 1, wherein translating further includes translating audio spoken by the customer into text selections, text options, and text commands associated with the virtual shopping cart.

* * * * *